United States Patent
Hirose

(10) Patent No.: US 8,093,310 B2
(45) Date of Patent: Jan. 10, 2012

(54) SHEET-LIKE PRODUCTS OF PHOTOREACTION, AS WELL AS MANUFACTURING METHOD AND APPARATUS FOR SHEET-LIKE PRODUCTS OF PHOTOREACTION

(75) Inventor: Isao Hirose, Ibaraki (JP)

(73) Assignee: Nitto Denko Corporation, ibaraki (JP)

(*) Notice: Subject to any disclaimer, the term of this patent is extended or adjusted under 35 U.S.C. 154(b) by 290 days.

(21) Appl. No.: 11/922,318

(22) PCT Filed: Jul. 12, 2006

(86) PCT No.: PCT/JP2006/313837
§ 371 (c)(1),
(2), (4) Date: Dec. 17, 2007

(87) PCT Pub. No.: WO2007/010789
PCT Pub. Date: Jan. 25, 2007

(65) Prior Publication Data
US 2009/0110922 A1    Apr. 30, 2009

(30) Foreign Application Priority Data

Jul. 21, 2005  (JP) ................ 2005-211783

(51) Int. Cl.
| | |
|---|---|
| C08F 2/46 | (2006.01) |
| B29C 35/08 | (2006.01) |
| B29C 35/10 | (2006.01) |
| B29C 65/00 | (2006.01) |
| B29C 71/00 | (2006.01) |
| B29C 65/02 | (2006.01) |
| B29D 11/00 | (2006.01) |
| B32B 37/00 | (2006.01) |
| B32B 38/04 | (2006.01) |
| B27G 11/02 | (2006.01) |
| B31F 5/04 | (2006.01) |

(52) U.S. Cl. ............ 522/1; 264/494; 264/495; 264/496; 264/237; 264/1.6; 156/275.5; 156/380.9

(58) Field of Classification Search ................. 522/182, 522/1; 428/345, 500, 343, 480, 481, 458; 526/328; 156/275.5, 380.9; 264/494–496, 264/237, 348, 1.38, 1.6
See application file for complete search history.

(56) References Cited

U.S. PATENT DOCUMENTS 4,391,663 A * 7/1983 Hutter, III .................. 156/64
(Continued)

FOREIGN PATENT DOCUMENTS

EP    1 072 664 A1    1/2001
(Continued)

OTHER PUBLICATIONS

Takahashi et al., Oct. 24, 1995, English Machine Translation of JP 07-275775.*

(Continued)

*Primary Examiner* — Mark Eashoo
*Assistant Examiner* — Jessica Paul
(74) *Attorney, Agent, or Firm* — Oliff & Berridge, PLC

(57) ABSTRACT

A multilayer body 20 formed by applying a layer between sheet-like bases 2 and 3 using an application portion 5 is conveyed at a predetermined speed by a conveying roll 11, and a polymerization reaction is induced in the layer of photoreactive product 8 by irradiating the multilayer body 20 that has been conveyed in an irradiation chamber 10 with ultraviolet rays emitted from ultraviolet ray emitting LEDs 25, and furthermore, low temperature air is blown out from cooling apparatuses 17, and thus, the multilayer body 20, which becomes of a high temperature state as a result of the polymerization reaction of the layer of photoreactive product 8, is cooled in the configuration.

2 Claims, 6 Drawing Sheets

U.S. PATENT DOCUMENTS

| | | | |
|---|---|---|---|
| 6,294,249 B1 * | 9/2001 | Hamer et al. | 428/345 |
| 2004/0011457 A1 | 1/2004 | Kobayashi et al. | |
| 2004/0101291 A1 | 5/2004 | Takabayashi et al. | |
| 2004/0159391 A1 * | 8/2004 | Yamaguchi et al. | 156/106 |

FOREIGN PATENT DOCUMENTS

| | | |
|---|---|---|
| EP | 1 245 656 A1 | 10/2002 |
| JP | A-02-060981 | 3/1990 |
| JP | A-07-275775 | 10/1995 |
| JP | A-09-181356 | 7/1997 |
| JP | U-63-144882 | 9/1998 |
| JP | A-2001-089719 | 4/2001 |
| JP | A-2002-121211 | 4/2002 |
| JP | A-2003-175361 | 6/2003 |
| JP | A-2003-295109 | 10/2003 |
| JP | A-2004-009422 | 1/2004 |
| JP | A-2004-035763 | 2/2004 |
| JP | A-2004-181951 | 7/2004 |
| JP | A-2004-358770 | 12/2004 |
| JP | A-2005-171213 | 6/2005 |
| JP | A-2005-177696 | 7/2005 |
| JP | A-2006-175706 | 7/2006 |

OTHER PUBLICATIONS

Japanese Office Action in Japanese Patent Application No. 2005-211783 mailed Sep. 13, 2011.

European Search Report for European Patent Application No. 06781007.7 mailed Oct. 7, 2011.

U.V. Process Supply, Inc., "CON-TROL-CURE: UV LED Cure-All Linear 100 Array", 2005, p. 102.

Hubert et al., "High Power UV LED Array for Curing Photoadhesives", Proceedings of SPIE, vol. 5260, Jan. 1, 2003, pp. 163-168.

Caiger et al., "Energy Curing in Ink Jet Digital Production Printing", IS&T Reporter "The Window on Imaging", vol. 20(4), Aug. 2005, pp. 1-12.

* cited by examiner

SHEET-LIKE PRODUCTS OF PHOTOREACTION, AS WELL AS MANUFACTURING METHOD AND APPARATUS FOR SHEET-LIKE PRODUCTS OF PHOTOREACTION

TECHNICAL FIELD

The present invention relates to sheet-like products of photoreaction fabricated by irradiating a multilayer body where a photoreactive product is sandwiched between layers with light, as well as a manufacturing method and an apparatus for the same, and in particular, to sheet-like products of photoreaction which can be efficiently and stably irradiated with ultraviolet rays emitted from an LED, as well as a manufacturing method and an apparatus for the same.

BACKGROUND ART

Conventional adhesive tapes and adhesive sheets having a structure where an adhesive layer is sandwiched between two films as shown in FIG. 4, for example, are widely known. Such adhesive tapes and adhesive sheets are formed through polymerization reaction of an application film where a photoreactive product of which the main component is an acryl monomer is applied on top of a light transmitting film as a layer, by irradiating this application film with energy rays, such as ultraviolet rays or electron beams.

In addition, lamps having a spectrum distribution in a wavelength range between 300 nm and 400 nm are often used as a conventional light source in an ultraviolet ray irradiating apparatus used for irradiation. Here, ultraviolet ray lamps used as the light source in concrete ultraviolet ray irradiating apparatuses include low output fluorescent light tube types, such as black light and chemical lamps, and high output types, such as low pressure mercury lamps, high pressure mercury lamps, metal halide lamps and microwave excited mercury lamps, as described in, for example, Japanese Unexamined Patent Publication H2 (1990)-60981 and Japanese Unexamined Patent Publication H7 (1995)-275775. In addition, an ultraviolet ray irradiating apparatus is formed with a number of ultraviolet ray lamps like these aligned on a sheet surface so that a wide region can be irradiated with ultraviolet rays. In the case where such an apparatus is put into practice as a machine for mass production, however, there are the following problems.

Patent Document 1: Japanese Unexamined Patent Publication H2 (1990)-60981 (pages 4 and 5)
Patent Document 2: Japanese Unexamined Patent Publication H7 (1995)-275775 (pages 2 and 3, FIGS. 1 and 2)

SUMMARY

In the case where sheet-like products of photoreaction are irradiated with light for polymerization reaction using a conventional ultraviolet ray irradiating apparatus as that described in the above Patent Document 1 or Patent Document 2, the sheets change in form due to heat, or the products expand or contract due to the rise in the temperature of the sheet caused by reaction heat or heat emission by the lamps, which causes trouble in the manufacture, and defective products. Therefore, though a cooling apparatus for cooling the sheet by blowing low temperature air is used together with an ultraviolet ray irradiating apparatus, the radiation output of fluorescent light tube type light sources is easily affected by the ambient temperature, and the radiation lowers when the ambient temperature is higher or lower than 20° C. Accordingly, there is a risk that polymerization reaction may become insufficient and the products may become defective due to the effects of the low temperature air or increase in the temperature of the sheet. Therefore, temperature adjusting equipment for keeping the temperature around the lamps constant becomes necessary, while at the same time, it is also necessary to isolate the lamps from the portion of the sheet which needs to be cooled. In addition, high output type light sources require a power supply with high output, and furthermore, the amount of heat emitted from the lamps is great, and therefore, a cooling apparatus for cooling the lamps is also necessary.

Here, FIG. 7 is a schematic diagram showing a conventional manufacturing apparatus 100 for sheet-like products of photoreaction using a fluorescent light tube type light source. As shown in FIG. 7, a manufacturing apparatus 100 for sheet-like products of photoreaction is provided with ultraviolet ray irradiating apparatuses 102 for irradiating a sheet 101 in which a photoreactive product is sandwiched with light, and cooling apparatuses 103 for blowing low temperature air in order to lower the temperature of the sheet, and the surroundings of the ultraviolet ray lamps 104 are isolated with ultraviolet ray transmitting glass 105 having heat insulating properties, in order to keep the temperature around ultraviolet ray lamps 104 constant. As a result, the temperature around the ultraviolet ray lamps 104 does not change due to the low temperature air blown from the cooling apparatuses 103 or the heat of the sheet 101, and the temperature can be kept constant, making it possible to stabilize the radiation output from the ultraviolet ray lamps 104. In addition, the sheet 101 is not affected by the heat emitted from the ultraviolet ray lamps 104, and therefore, the sheet 101 does not change in form due to heat, making it difficult for thermal expansion or thermal contraction to occur in the product of photoreaction.

However, ultraviolet ray transmitting glass or a film having a large area becomes necessary in order to thermally insulate the surroundings of the ultraviolet ray lamps in the above described conventional ultraviolet ray irradiating apparatus, and the cost becomes high. Furthermore, glass or a film is placed between the ultraviolet ray lamps and the sheet, and thus, loss of light energy becomes great.

In addition, the life of ultraviolet ray lamps is relatively short, and therefore, the illuminance gradually lowers as time elapses. Accordingly, a control apparatus for controlling the output becomes necessary, in order to use the lamps to provide constant illumination for industrial purposes.

In addition, time for warm-up becomes necessary in high pressure mercury lamps, metal halide lamps and the like, before the illumination stabilizes, and thus, the efficiency of operation lowers.

Furthermore, mercury, which is an environment polluting substance, is used in ultraviolet ray lamps, and therefore, there is a risk that the environment may be negatively affected when a large number of ultraviolet ray lamps are disposed of after use.

The present invention is provided in order to solve the above described problems with the prior art, and an object is to provide sheet-like products of photoreaction which can be efficiently and stably irradiated with ultraviolet rays emitted from LEDs, as well as a manufacturing method and an apparatus for the same.

To achieve the above objects, one aspect of the present application provides a manufacturing method for sheet-like products of photoreaction including a conveying step for a multilayer body made of a photoreactive product and sheet-like members in layers which sandwich the photoreactive product in a predetermined direction, and an inducing step for a polymerization reaction in the photoreactive product by irradiating one side or the two sides of the conveyed multilayer body is the conveying step with ultraviolet rays emitted from an LED.

In another aspect, the present application provides the manufacturing method for sheet-like products of photoreaction, wherein the multilayer body conveyed in a predetermined direction is cooled by cooling device placed adjacent to the LED.

The sheet-like product of photoreaction manufactured by the manufacturing method for sheet-like products of photoreaction can be a pressure sensitive adhesive sheet.

In another aspect, the present application provides a manufacturing apparatus for sheet-like products of photoreaction, comprising: a multilayer body made of a photoreactive product and sheet-like members in layer form which sandwich the photoreactive product; light irradiating device for inducing a polymerization reaction in the photoreactive product by irradiating one side or the two sides of the multilayer body with light; and conveying device for conveying the multilayer body in a predetermined direction, wherein the light irradiating device adopts an LED for emitting ultraviolet rays as a light source.

In still another aspect, the present application provides a manufacturing apparatus for sheet-like products of photoreaction further comprising a cooling device for cooling the multilayer body which is conveyed in a predetermined direction by the conveying device, wherein the cooling device is placed adjacent to the LED.

The present application also provides a manufacturing apparatus for sheet-like products of photoreaction, wherein a sheet-like product of photoreaction manufactured using the manufacturing apparatus for sheet-like products of photoreaction is a pressure sensitive adhesive sheet.

The present application also provides a sheet-like product of photoreaction manufactured by the above described manufacturing methods, or using the manufacturing apparatus for sheet-like products of photoreaction.

In accordance with the manufacturing method for sheet-like products of photoreaction according to one embodiment, a polymerization reaction is induced in the above described photoreactive product by irradiating one side or the two sides of the multilayer body with ultraviolet rays emitted from the LEDs, and therefore, the temperature of the multilayer body can be prevented from rising due to the heat emitted from the light source, because the LEDs barely emit any heat in comparison with the case where a conventional low output fluorescent light tube type light source, such as black light or chemical lamps, or a high output type light source, such as low pressure mercury lamps, high pressure mercury lamps, metal halide lamps or microwave excited mercury lamps, is used. Accordingly, sheet-like members do not change in form due to heat emitted from the light source, and it can be made difficult for the product of light reaction to expand and contract.

In addition, it is difficult for the radiation output to be affected by the ambient temperature in comparison with the fluorescent light tube type light source, and therefore, it is not necessary to take into consideration the effects of low temperature air for cooling the multilayer body and heat emission due to the polymerization reaction in the multilayer body, and it is not necessary to provide ultraviolet ray transmitting glass or a film in order to keep the ambient temperature around the LEDs constant. Accordingly, there is no loss of light energy due to insertion of glass or a film between the light source and the multilayer body, and efficient and stable radiation is made possible, and the cost performance increases. Furthermore, there is no risk of the output lowering, even in the case where low temperature air for cooling the multilayer body is blown against the LEDs, and therefore, the cooling apparatus for blowing out low temperature air can be placed adjacent to the LEDs, thus making it possible to make the apparatus compact.

In addition, the life of LEDs is ten or more times longer (no less than 50,000 hours) than that of other ultraviolet ray lamps, and therefore, it is not necessary to take into consideration that the illuminance lowers as time elapses, and no control apparatus for the use of the LEDs to provide constant illumination is necessary. In addition, the power consumption is low, and thus it is possible to reduce the cost of manufacture.

Furthermore, the individual LEDs are small in size, and therefore, an ultraviolet ray irradiating apparatus where LEDs are arranged along the line along which the multilayer body is conveyed can be designed, and therefore, the intensity of ultraviolet rays with which the multilayer body is irradiated can be made uniform, and thus, it becomes possible to carry out irradiation with light more efficiently and for a longer period of time.

In addition, when LEDs are used as the light source, time for warm-up becomes unnecessary before illumination stabilizes, unlike with high pressure mercury lamps and metal halide lamps, and the system can be used immediately after the light is turned on, making the efficiency in operation increase.

Furthermore, no environment polluting substances, such as mercury, are used in LEDs, and therefore, there is no risk of the environment being negatively affected when the LEDs are disposed of after use.

In addition, in accordance with one embodiment of a manufacturing method for sheet-like products of photoreaction, the cooling device arranged adjacent to the LEDs cools the multilayer body conveyed in a predetermined direction, and therefore, there is no risk of the sheet-like members changing in form due to the heat from the polymerization reaction, so that it can be made difficult for the products of photoreaction to thermally expand and thermally contract, and at the same time, it can be made possible to make the apparatus compact.

In addition, in accordance with some embodiments of manufacturing method for sheet-like products of photoreaction, pressure sensitive adhesive sheets are manufactured as sheet-like products of photoreaction, and therefore, it becomes possible to manufacture pressure sensitive adhesive sheets through efficient and stable radiation of ultraviolet rays using LEDs as the light source.

In addition, in the manufacturing apparatus for sheet-like products of photoreaction in some embodiments, polymerization reaction is induced in the above described products of photoreaction by irradiating one side or the two sides of the multilayer body with ultraviolet rays emitted from the LEDs, and therefore, the temperature of the multilayer body can be prevented from rising due to the heat emitted from the light source, because the LEDs barely emit any heat in comparison with the case where a conventional low output fluorescent light tube type light source, such as black light or chemical lamps, or a high output type light source, such as low pressure mercury lamps, high pressure mercury lamps, metal halide lamps or microwave excited mercury lamps, is used. Accordingly, sheet-like members do not change in form due to heat emitted from the light source, and it can be made difficult for the product of light reaction to expand and contract.

In addition, it is difficult for the radiation output to be affected by the ambient temperature in comparison with the fluorescent light tube type light source, and therefore, it is not necessary to take into consideration the effects of low temperature air for cooling the multilayer body and heat emission due to the polymerization reaction in the multilayer body, and it is not necessary to provide ultraviolet ray transmitting glass or a film in order to keep the ambient temperature around the LEDs constant. Accordingly, there is no loss of light energy due to insertion of glass or a film between the light source and the multilayer body, and efficient and stable radiation is made possible, and the cost performance increases. Furthermore, there is no risk of the output lowering, even in the case where low temperature air for cooling the multilayer body is blown against the LEDs, and therefore, the cooling apparatus for blowing out low temperature air can be placed adjacent to the LEDs, thus making it possible to make the apparatus compact.

In addition, the life of LEDs is ten or more times longer (no less than 50,000 hours) than that of other ultraviolet ray lamps, and therefore, it is not necessary to take into consideration that the illuminance lowers as time elapses, and no control apparatus for the use of the LEDs to provide constant illumination is necessary. In addition, the power consumption is low, and thus it is possible to reduce the cost of manufacture.

Furthermore, the individual LEDs are small in size, and therefore, an ultraviolet ray irradiating apparatus where LEDs are arranged along the line along which the multilayer body is conveyed can be designed, and therefore, the intensity of ultraviolet rays with which the multilayer body is irradiated can be made uniform, and thus, it becomes possible to carry out irradiation with light more efficiently and for a longer period of time.

In addition, when LEDs are used as the light source, time for warm-up becomes unnecessary before illumination stabilizes, unlike with high pressure mercury lamps and metal halide lamps, and the system can be used immediately after the light is turned on, making the efficiency in operation increase.

Furthermore, no environment polluting substances, such as mercury, are used in LEDs, and therefore, there is no risk of the environment being negatively affected when the LEDs are disposed of after use.

In addition, in the manufacturing apparatus for sheet-like products of photoreaction according to some embodiments, the cooling device arranged adjacent to the LEDs cools the multilayer body that is conveyed in a predetermined direction, and therefore, there is no risk of the sheet members changing in form due to the heat from the polymerization reaction, and thus, it can be made difficult for the products of photoreaction to thermally expand and thermally contract, and at the same time, it can be made possible to make the apparatus compact.

In addition, in the manufacturing apparatus for sheet-like products of photoreaction according to some embodiments, pressure sensitive adhesive sheets are manufactured as sheet-like products of photoreaction, and therefore, it becomes possible to manufacture pressure sensitive adhesive sheets through efficient and stable radiation of ultraviolet rays using LEDs as the light source.

Furthermore, the sheet-like product of photoreaction in some embodiments may be a sheet-like product of photoreaction manufactured through efficient and stable radiation of ultraviolet rays using LEDs as the light source, and therefore, it becomes possible to use the sheet-like product as a low cost adhesive tape or adhesive sheet and maintain high quality.

Figure 1:
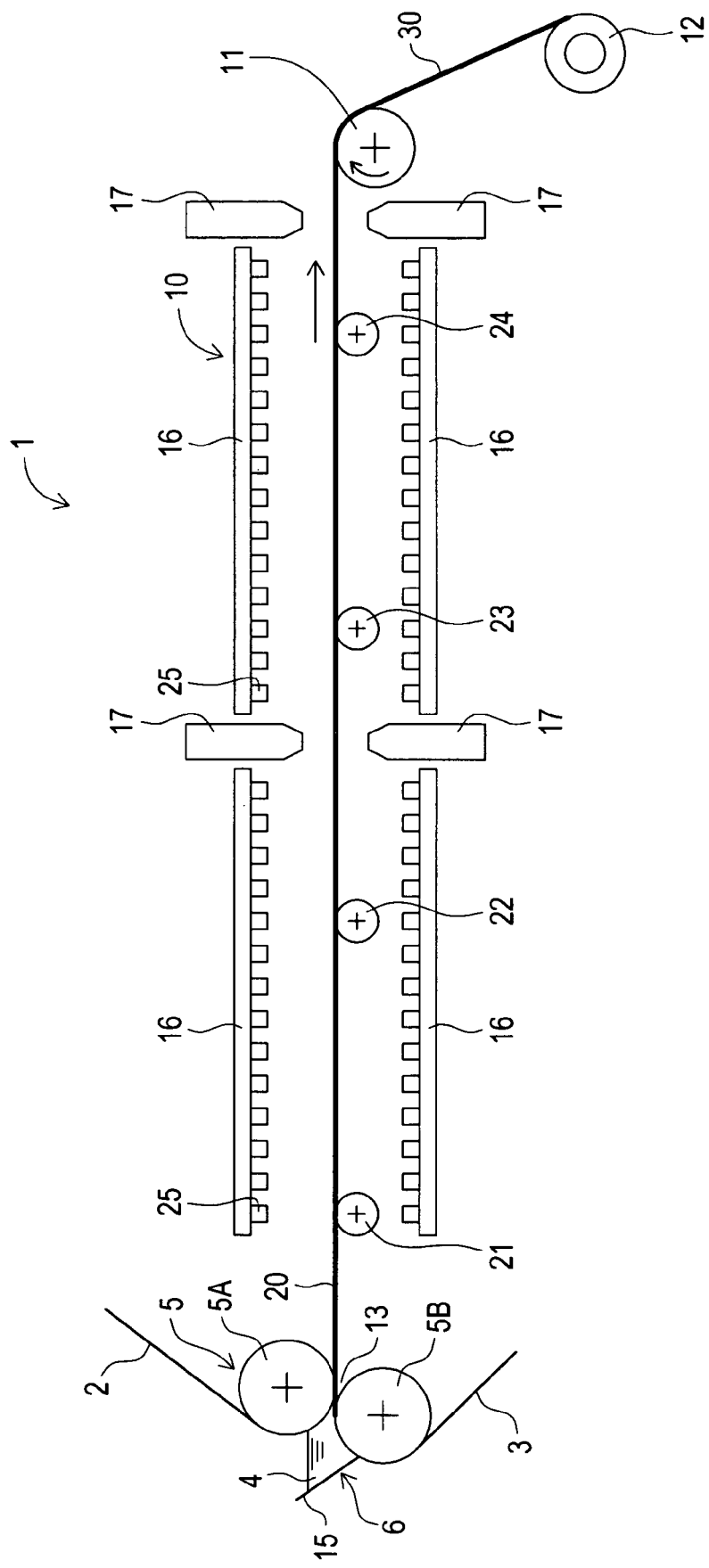
FIG. 1 is a schematic diagram showing the main portion of the manufacturing apparatus for sheet-like products of photoreaction according to the first embodiment.

EXPLANATION OF REFERENCES 1 manufacturing apparatus for sheet-like products of photo reaction
2, 3 sheet-like base
4 photoreactive product
5 application portion
5A upper surface roll
5B lower surface roll
8 photoreactive product
10, 52 irradiation chamber
11 conveying roll
16, 53 ultraviolet ray irradiating apparatus
17, 54 cooling device
20 multilayer body
21-24 support roll
25 ultraviolet ray emitting LED
30 optimal sheet-like product of photoreaction
31 pressure sensitive adhesive layer
61-67 load applying roll

BEST MODE FOR CARRYING OUT THE INVENTION

In the following, the sheet product of photoreaction, as well as the manufacturing method and apparatus for sheet-like products of photoreaction, according to the first and second embodiments of the present invention are described in detail in reference to the drawings.

First Embodiment

First, the schematic configuration of a manufacturing apparatus 1 for sheet-like products of photoreaction according to by the first embodiment which the sheet-like product of photoreaction is manufactured is described in reference to FIG. 1. FIG. 1 is a diagram showing the schematic configuration of the manufacturing apparatus for sheet-like products of photoreaction according to the first embodiment. Here, according to the first embodiment, a manufacturing apparatus for manufacturing pressure sensitive adhesive sheets where a photoreactive product applied so as to have a uniform thickness has converted to a pressure sensitive adhesive layer as a result of photopolymerization with light from an irradiation chamber is cited as an example for the description, as the manufacturing apparatus for sheet-like products of photoreaction.

As shown in FIG. 1, the manufacturing apparatus 1 for sheet-like products of photoreaction according to the first embodiment is basically formed of: an application portion 5 for feeding out sheet-like bases 2 and 3 and applying a photoreactive product 4 to the sheet-like bases 2 and 3 with a predetermined thickness (1.0 mm in the first embodiment); a liquid supplying tank 6 for supplying a photoreactive product 4 to the application portion 5; an irradiation chamber 10 for irradiating a layer of photoreactive product 8 (see FIG. 3) made of the photoreactive product 4 that has been applied to the sheet-like bases 2 and 3 with light; a conveying roll 11 for conveying a sheet of the photoreactive product within the irradiation chamber 10 by providing constant tension to the sheet of the photoreactive product; and a winding portion 12 for rolling up the manufactured sheet of photoreactive product where the polymerization is completed. In the following, the configuration of the respective portions is described in detail.

The application portion 5 is formed of an upper surface roll 5A and a lower surface roll 5B which are respectively arranged on the top and the bottom with a predetermined space in such a manner that the photoreactive product 4 is applied to the sheet-like bases 2 and 3 while the sheet-like bases 2 and 3 pass through the space 13 created between the upper surface roll 5A and the lower surface roll 5B. Concretely, the photoreactive product 4 with which the liquid supplying tank 6 is filled is supplied to the space created between the sheet-like bases 2 and 3 while the bases which are fed out from the upper surface roll 5A and the lower surface roll 5B are conveyed along the space 13 so that the photoreactive product is applied in layer form so as to have a predetermined width (a width which is slightly smaller than the width of the sheet-like bases 2 and 3) and a predetermined thickness (1.0 mm in the first embodiment) in the direction of the width of the sheet-like bases 2 and 3.

In addition, the liquid supplying tank 6 is a tank which is filled with the photoreactive product 4, which becomes an application liquid, in the space with a predetermined volume created of a wall portion 15 provided on the lower surface roll 5B between the upper surface roll 5A and the lower surface roll 5B.

The irradiation chamber 10 irradiates the photoreactive product 4 which is applied between the sheet-like bases form 2 and 3 with light from ultraviolet ray irradiating devices 16 so that a photopolymerization reaction is induced, and at the same time, blows out low temperature air from cooling devices 17 so that the conveyed sheet is cooled. This irradiation chamber 10 is equipped with: support rolls 21 to 24 which support a pair of sheet-like bases 2 and 3 (hereinafter referred to as multilayer body 20, see FIG. 3) which sandwich the layer of photoreactive product 8 which is conveyed into the irradiation chamber 10, and support the multilayer body 20 in the horizontal direction; ultraviolet ray irradiating devices 16 with ultraviolet ray emitting LEDs 25 for radiating ultraviolet rays as the light source; and cooling devices 17 for cooling the multilayer body 20 which becomes of a high temperature state as a result of the polymerization reaction in the layer of photoreactive product 8 by blowing out low temperature air.

In addition, the layer of photoreactive product 8 in the multilayer body 20 which is conveyed into the irradiation chamber 10 allows ultraviolet rays irradiated from the above described ultraviolet ray emitting LEDs 25 to initiate the polymerization reaction, and forms a pressure sensitive adhesive layer 31 (see FIG. 4) after the completion of the polymerization reaction.

Here, the support rolls 21 to 24 in the first embodiment are arranged in four portions in total at equal intervals within the irradiation chamber 10, and driven by a separately provided drive motor so as to rotate in such a manner that the speed on the surface of the rolls is in sync with the speed of conveyance of the multilayer body 20. As a result, the multilayer body can be conveyed into the irradiation chamber 10 without damaging the surface of the sheet-like bases 2 and 3. Here, it is not necessary for the support rolls 21 to 24 to be driven so as to rotate, and the support rolls may be freely rotatable for support.

In addition, the ultraviolet ray irradiating devices 16 are radiating devices for radiating ultraviolet rays toward the upper surface and the lower surface of the multilayer body 20 when a plurality of ultraviolet ray emitting LEDs 25 provided at predetermined intervals above and below the multilayer body 20 which is conveyed within the irradiation chamber 10 emit ultraviolet rays. Here, ultraviolet ray emitting LEDs 25, which emit light of which the wavelength is in the same region as the wavelength absorbed by the photopolymerization initiator added to the photoreactive product 4, are used as the light source of the ultraviolet ray irradiating devices 16, and "product name: NSHU550B (Nichia Corporation)" and "product name: NS365L-5CFA (Nitride Semiconductors Co., Ltd.)," for example, can be used.

In addition, it is difficult for the radiation output of the ultraviolet ray emitting LEDs 25 to be affected by the ambient temperature in comparison with ultraviolet ray lamps, such as black light and chemical lamps, and therefore, it is not necessary to provide a heat insulating wall, such as of ultraviolet ray transmitting glass or a film around the ultraviolet ray emitting LEDs 25, and furthermore, the ultraviolet ray emitting LEDs 25 barely emit any heat, and therefore, it is also possible to place the ultraviolet ray emitting LEDs in the vicinity of the multilayer body 20. In addition, each of the ultraviolet ray emitting LEDs 25 is small in size, and it is difficult for the radiation output of one to be affected by the heat emitted by the others, making it possible for the ultraviolet ray emitting LEDs to be arranged at shorter intervals along the line along which the multilayer body 20 is conveyed. Accordingly, the ultraviolet ray irradiating devices 16 can be designed in such a manner that the ultraviolet ray emitting LEDs 25 are aligned along the line along which the multilayer body 20 is conveyed, and therefore, the intensity of ultraviolet rays with which the multilayer body 20 is irradiated can be kept uniform, and it becomes possible to irradiate light more efficiently and for a longer period of time.

Figure 2:
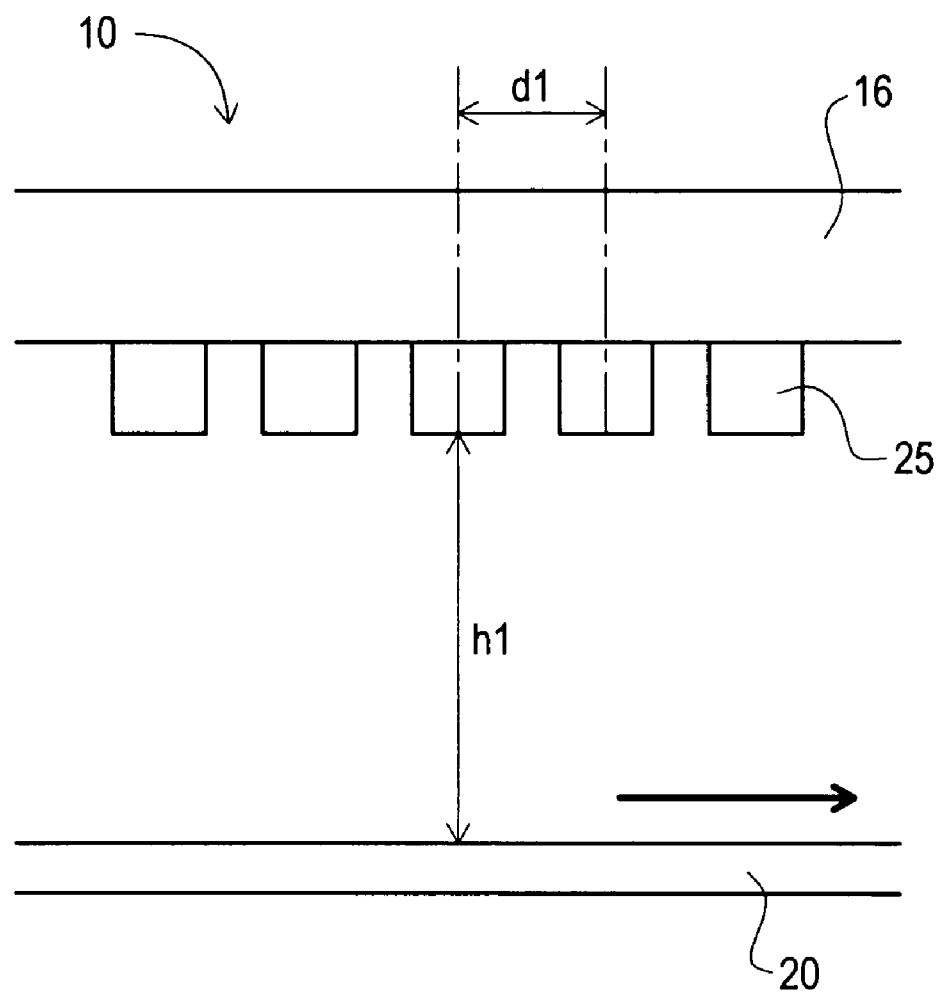
FIG. 2 is a diagram showing a certain enlarged portion of the manufacturing apparatus for sheet-like products of photoreaction according to the first embodiment in the vicinity of ultraviolet ray emitting LEDs.

Here, FIG. 2 is a diagram showing a certain enlarged portion in the vicinity of ultraviolet ray emitting LEDs 25 in the manufacturing apparatus for sheet-like product of photoreaction according to the first embodiment shown in FIG. 1.

As shown in FIG. 2, the ultraviolet ray emitting LEDs 25 are aligned in the ultraviolet ray irradiating devices 16 in such a manner that the intervals between adjacent LEDs are d1 and the distance from the conveyed multilayer body 20 is h1. Here, an appropriate value for d1 is 5 mm to 20 mm, in order to uniformly irradiate the entirety of the surface of the multilayer body 20 with a sufficient amount of ultraviolet rays, preferably 5 mm to 50 mm. In particular, it is possible to gain an optimal sheet-like product of photoreaction 30 by adjusting the value of d1 to 10 mm.

Meanwhile, an appropriate distance h1 is 20 mm to 150 mm, in order to uniformly irradiate the entirety of the surface of the multilayer body 20 with a sufficient amount of ultraviolet rays, preferably 50 mm to 100 mm. In particular, it is possible to gain an optimal sheet-like product of photoreaction 30 by adjusting the value of h1 to 80 mm.

In addition, the cooling devices 17 are cooling devices for cooling by blowing out low temperature air from a nozzle against the two surfaces of the multilayer body 20, and one pair is made up of one on top and one on the bottom, and pairs are provided in two locations in total in the first embodiment. Sheet-like bases 2 and 3 can be prevented from changing in form due to heat emitted from the light source by providing the cooling devices 17, and it can be made difficult for the photoreactive product 4 to expand and contract. In addition, as described above, it is difficult for the radiation output of the ultraviolet ray emitting LEDs 25, which are the light source of the ultraviolet ray irradiating devices 16, to be affected by the ambient temperature, and therefore, there is no risk of the output lowering, even in the case where the low temperature air blown out from the cooling devices 17 is blown against the ultraviolet ray emitting LEDs 25. Accordingly, as shown in FIG. 1, the cooling devices 17 according to the first embodiment are arranged so as to be adjacent to the ultraviolet ray emitting LEDs 25, and thus, it is possible to make the apparatus compact.

In addition, the conveying roll 11 is formed of a pair of rolls; top and bottom, and is driven by a drive motor (not shown) so as to rotate in the direction of the arrow in FIG. 1. There is constant tension in the multilayer body 20 which passes between the conveying rolls as the conveying roll 11 is driven so as to rotate, and at the same time, the multilayer body 20 is conveyed through the irradiation chamber 10. In addition, the sheet-like product of photoreaction 30, which is gained by completing photopolymerization of the layer of photoreactive product 8 in the multilayer layer body 20, is conveyed out from the irradiation chamber 10 and rolled up around the winding portion 12.

After that, the sheet-like product of photoreaction 30, which is rolled up around the winding portion 12, is cut into pieces of a predetermined size, and thus, a target adhesive tape or adhesive sheet can be gained.

Figure 3:
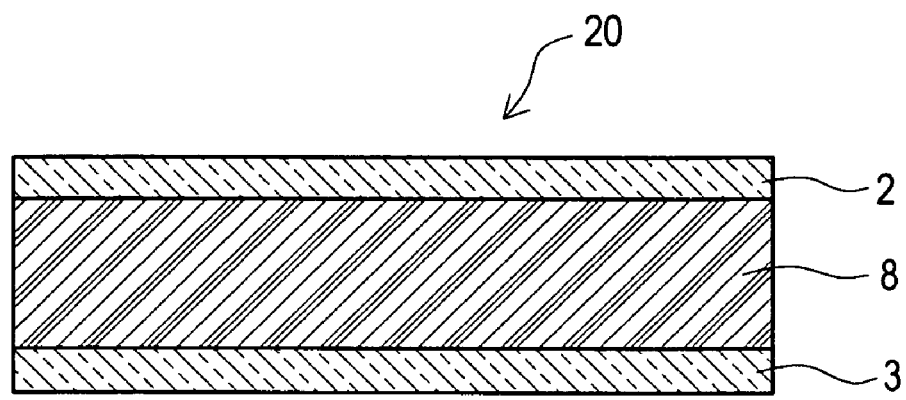
FIG. 3 is a cross sectional diagram showing the multilayer body before the completion of photopolymerization in the direction of the width.
Figure 4:
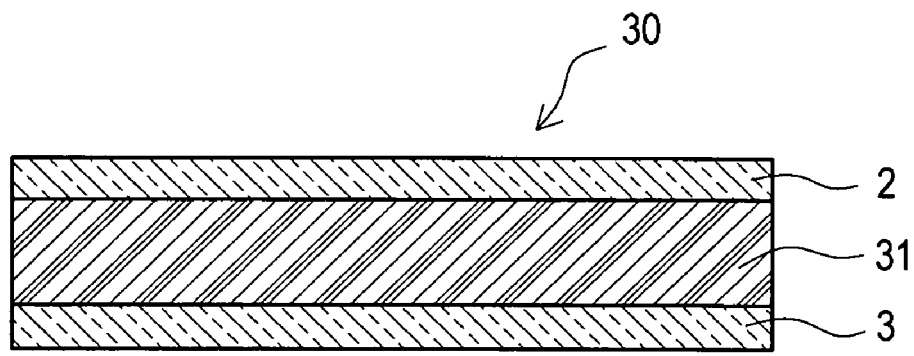
FIG. 4 is a cross sectional diagram showing the sheet-like product of photoreaction after the completion of photopolymerization in the direction of the width.

Next, the multilayer body 20 formed by the application portion 5, and the sheet-like product of photoreaction 30 manufactured using the manufacturing apparatus 1 for sheet-like products of photoreaction using the multilayer body 20 are described. FIG. 3 is a cross sectional diagram showing the multilayer body 20 before the completion of photopolymerization as cut in the direction of the width. FIG. 4 is a cross sectional diagram showing the sheet-like product of photoreaction 30 after the completion of photopolymerization as cut in the direction of the width.

The multilayer body 20 is formed of sheet-like bases 2 and 3 and a layer of photoreactive product 8 sandwiched between the sheet-like bases 2 and 3, as shown in FIG. 3.

Plastic films, such as polyester films and polypropylene films, paper, such as craft paper and Japanese paper, and metal foils, such as aluminum foil, can be used for the sheet-like bases 2 and 3. Here, according to the first embodiment, the upper surface and the lower surface of the conveyed multilayer body 20 is irradiated with light from the ultraviolet ray irradiating devices 16 provided within the irradiation chamber 10 as described above, so that photopolymerization is induced in the layer of photosensitive product 8 sandwiched between the sheet-like bases 2 and 3, and therefore, light transmitting films, such as of polyethylene terephthalate, are used for the sheet-like bases 2 and 3.

In addition, the photoreactive product 4 that forms the layer of photoreactive product 8 contains a monomer or a partially polymerized monomer and a photopolymerization initiator, and becomes a pressure sensitive adhesive after polymerization through irradiation with light, and a publicly known material, such as an acryl based, polyester based or epoxy based material, is used. From among these, an acryl based photopolymerizing composite is particularly preferable for use in the manufacture of a sheet-like product of photoreaction.

In addition, in the manufacturing apparatus 1 for sheet-like products of photoreaction according to the first embodiment, an alkyl (meth) acrylate ester of which the average carbon number in the alkyl group is 2 to 14 and a monoethylene based unsaturated monomer which can copolymerize with this are used for the photoreactive product 4. Here, as the alkyl (meth) acrylate ester, alkyl acrylate or methacrylate having 2 to 14 carbons in the alkyl group, such as butyl acrylate, isononyl acrylate, isooctyl acrylate or 2-ethylhexyl acrylate, is used.

Meanwhile, as the monoethylene based unsaturated monomer which can copolymerize with this, a polar monomer which is carboxylic acid such as acrylic acid, methacrylic acid or maleic acid, or a nitrogen containing monomer such as acrylamide, N-vinyl pyrrolidone or acryloyl morpholine, is used.

In addition, it is useful to use an isocyanate based compound as a cross binder, or to add a publicly known cross linking material such as an epoxy based compound, or multifunctional (meth)acrylate, in order to increase the holding properties of the adhesive after polymerization. As the multifunctional (meth)acrylate, trimethylolpropane tri(meth) acrylate, pentaerythritol tetra(meth)acrylate, 1, 2-ethylene glycol di(meth)acrylate or 1,6-hexanediol di(meth)acrylate, for example, is used. In the case where the added amount of these cross binders is too great, the cross linking density becomes high, and necessary force against peeling cannot be gained, while in the case where the amount is too small, necessary force for condensation cannot be gained. An appropriate amount for addition is 0.01 weight parts to 0.5 weight parts per 100 weight parts of the above described photoreactive monomer, and the optimal amount for addition is 0.02 weight parts to 0.3 weight parts.

As the photopolymerization initiator, a ketal based photopolymerization initiator, such as 2,2-dimethoxy-1,2-diphenyl ethane-1-on (for example Irgacure 651, made by Ciba Specialty Chemicals), an acetophenone based photopolymerization initiator, such as 1-hydroxy-cyclohexyl-phenyl-ketone (for example Irgacure 184, made by Ciba Specialty Chemicals), a benzoin ether based photopolymerization initiator, such as benzoin ethyl ether or benzoin propyl ether, a ketone halide, acyl phosphine oxide (for example Lucirin TPO, made by BASF Japan Ltd.), or another publicly known photopolymerization initiator is used. Here, it may be possible to use two or more of these photopolymerization initiators together, depending on the application.

In addition, in the case where the added amount of the above described photopolymerization initiator is too great, it becomes easy for copolymers having a low molecular weight to be generated, while in the case where the amount is too small, it becomes difficult for the polymerization reaction to progress. An appropriate amount for addition is 0.01 weight parts to 2 weight parts per 100 weight parts of the above described photoreactive monomer, and the optimal amount for addition is 0.05 weight parts to 1 weight part.

Furthermore, an inorganic or organic filler can be added to the photoreactive product 4 according to the first embodiment, in order to increase the adhesive strength under shear and processability. As the inorganic filler, silica, calcium carbonate, clay, titanium oxide, glass balloon, alumina balloon and the like can be cited, as the organic filler, polyester beads, vinylidene chloride balloon, acryl balloon and the like can be cited.

In addition, such an amount of a coloring pigment as not to hinder photopolymerization can be used to color the photoreactive product 4. A black adhesive is often used, and in this case, the adhesive is colored with carbon black. The added amount of carbon black is in such a range as not to exceed 1 weight part per 100 weight parts of (meth) acrylate ester monomer. In the case where the amount exceeds 1 weight part, photopolymerization is not induced.

In addition, it is desirable for the viscosity of the photoreactive product 4 which becomes the application liquid to be no less than 1 Pas at room temperature. The viscosity is usually adjusted so as to be appropriate for application by mixing in a thixotropy additive, through partial photopolymerization through irradiation with light, or through thermal polymerization.

Thus, when the above described multilayer body 20 formed in the application portion 5 passes through the irradiation chamber 10 in the manufacturing apparatus 1 for sheet-like products of photoreaction, photopolymerization is induced in the layer of photoreactive product 8 by light irradiated from the ultraviolet ray irradiating devices 16. After that, when the polymerization reaction is almost completed (polymerization ratio of no less than 95%) after irradiation for a predetermined period of time, a layer of pressure sensitive adhesive 31 can be gained, and thus, a sheet-like product of photoreaction 30 having a layer of pressure sensitive adhesive 31 is fabricated, as shown in FIG. 4.

Next, a manufacturing process for manufacturing the sheet-like product of photoreaction 30 using the manufacturing apparatus 1 for sheet-like products of photoreaction formed as described above according to the first embodiment is described in the following.

First, sheet-like bases 2 and 3 are fed out in the upward and downward directions, respectively, by device of the upper surface roll 5A and the lower surface roll 5B. Then, the photoreactive product 4 within the liquid supplying tank 6 is applied between the sheet-like bases 2 and 3 as a layer (having a thickness of 1.0 mm in the first embodiment) when the sheet-like bases 2 and 3 that are fed out pass through the gap 13 created between the upper surface roll 5A and the lower surface roll 5B. As a result, a multilayer body 20 where the layer of photoreactive product 8 is sandwiched in the center as shown in FIG. 3 is formed.

After that, the multilayer body 20 formed in the application portion 5 is conveyed into the irradiation chamber 10 for radiating ultraviolet rays as energy beams in accordance with the drive for rotation of the conveying roll 11. The multilayer body 20 that is conveyed into the irradiation chamber 10 is irradiated with ultraviolet rays from ultraviolet ray emitting LEDs 25 provided with the ultraviolet ray irradiating devices 16, and as a result, a polymerization reaction is initiated. In addition, low temperature air is blown against the two surfaces of the multilayer body 20 that is conveyed by the cooling devices 17, and thus, the layer of photoreactive product 8 that has been heated through the polymerization reaction is cooled. Here, the intensity of ultraviolet rays from the ultraviolet ray emitting LEDs 25 and the speed of conveyance of the multilayer body 20 are set in such a manner that the polymerization reaction in the layer of photoreactive product 8 is almost completed while the multilayer body 20 passes through the irradiation chamber 10. Here, "the polymerization reaction is almost completed" device that the polymerization ratio is no less than 95%.

In addition, the sheet-like product of photoreaction 30, where the layer of pressure sensitive adhesive 31 has been formed through photopolymerization, is conveyed out from the irradiation chamber 10, passes between the conveying rolls 11, and is rolled up by the winding portion 12. Then, the rolled up sheet-like product of photoreaction 30 is cut into pieces of a predetermined size, and thus, a target adhesive tape can be gained.

As described above in detail, in the manufacturing apparatus 1 and the manufacturing method for sheet-like products of photoreaction according to the first embodiment, a polymerization reaction is induced in the layer of photoreactive product 8 in the multilayer body 20 that is formed through application of a layer between sheet-like bases 2 and 3 in the application portion 5 by ultraviolet rays irradiated from the ultraviolet ray emitting LEDs 25 in the irradiation chamber 10. At this time, the ultraviolet ray emitting LEDs 25, which are the light source, barely emit any heat in comparison with the case where a low output fluorescent light tube type light source, such as conventional black light or chemical lamps, or a high output type light source, such as low-pressure mercury lamps, high pressure mercury lamps, metal halide lamps or microwave excited mercury lamps, is used, and the temperature of the multilayer body 20 can be prevented from rising due to heat emitted from the light source. Accordingly, the sheet-like bases 2 and 3 do not change in form due to heat emitted from the light source, and in addition, it can be made difficult for the photoreactive product 4 to expand and contract.

In addition, it is difficult for the radiation output of the ultraviolet ray emitting LEDS 25 to be affected by the ambient temperature in comparison with fluorescent light tube type light sources, and therefore, it is not necessary to take into consideration the effects of low temperature air for cooling the multilayer body or heat emitted in the polymerization reaction of the multilayer body 20, and it is not necessary to provide ultraviolet ray transmitting glass or a film around the ultraviolet ray emitting LEDs 25 in order to keep the ambient temperature constant. Accordingly, there is no loss of light energy due to insertion of glass or a film between the ultraviolet ray emitting LEDs 25, which are the light source, and the multilayer body 20, and thus, efficient and stable irradiation becomes possible, and thus, the cost performance increases.

Furthermore, there is no risk of the output lowering, even in the case where low temperature air for cooling the multilayer body 20 is blown out against the ultraviolet ray emitting LEDs 25, and therefore, the cooling devices 17 for blowing out low temperature air can be placed adjacent to the ultraviolet ray emitting LEDs 25, and thus, it becomes possible to make the apparatus compact.

In addition, each of the ultraviolet ray emitting LEDs 25 is small in size, and therefore, the ultraviolet ray irradiating devices 16 in which the ultraviolet ray emitting LEDs 25 are provided can be designed so as to be aligned along the line along which the multilayer body 20 is conveyed in such a manner that the intensity of ultraviolet rays with which the multilayer body 20 is irradiated can be kept uniform, and thus, more efficient light irradiation for a long period of time becomes possible.

In addition, time for warm-up before radiation stabilizes becomes unnecessary using the ultraviolet ray emitting LEDs 25 as the light source, unlike with high pressure mercury lamps and metal halide lamps, so that the system can be used immediately after the light is turned on, and the work efficiency increases.

Furthermore, no environment polluting substance, such as mercury, is used in ultraviolet ray emitting LEDs 25, and therefore, there is no risk of negatively affecting the environment, even when the ultraviolet ray emitting LEDs 25 are disposed of after use.

In addition, the sheet-like product of photoreaction 30 manufactured in accordance with the manufacturing apparatus 1 and the manufacturing method for sheet-like products of photoreaction according to the first embodiment is a type of sheet-like product of photoreaction manufactured through efficient and stable irradiation with ultraviolet rays using the ultraviolet ray emitting LEDs 25 as the light source, and it is possible to use this as a low-cost adhesive tape or adhesive sheet having high quality.

Second Embodiment

Figure 5:
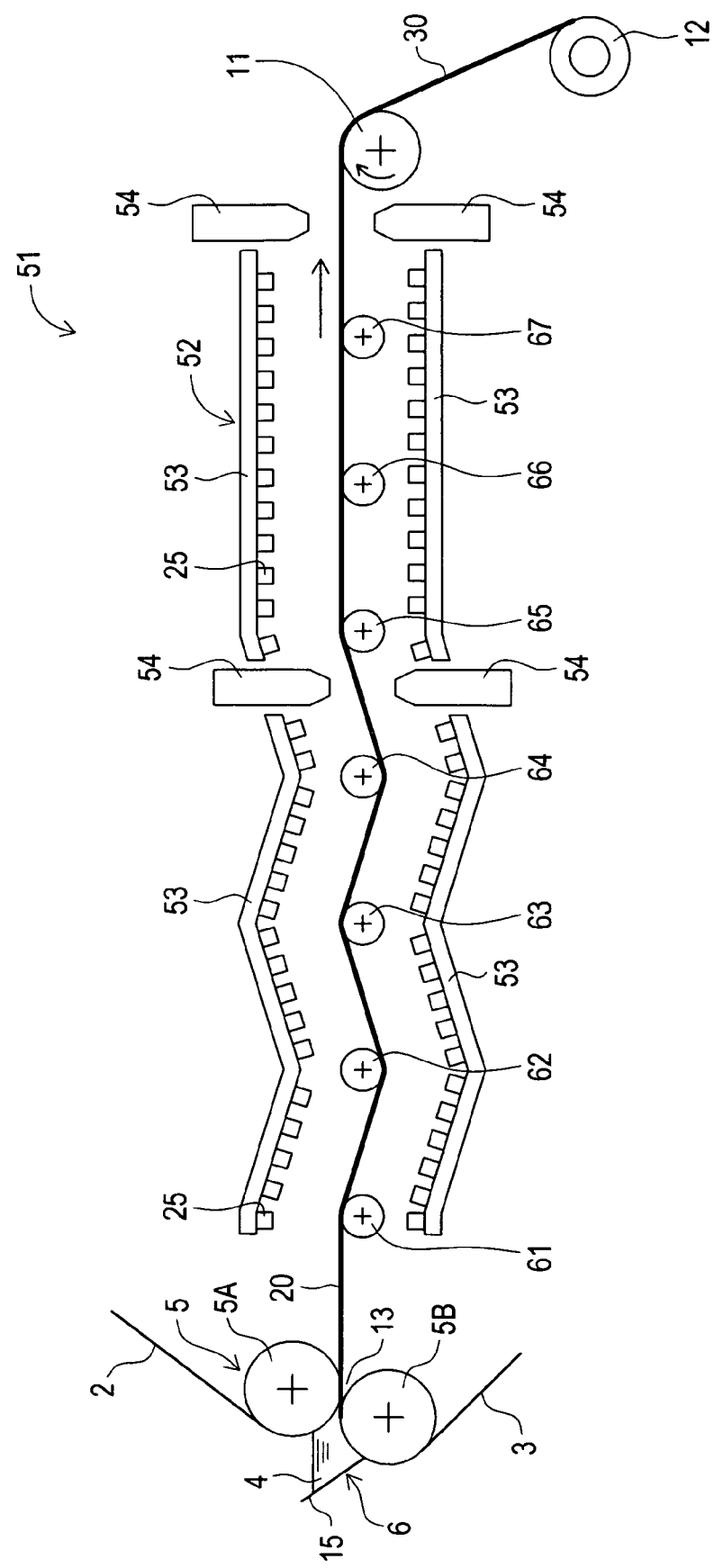
FIG. 5 is a schematic diagram showing the main portion of the manufacturing apparatus for sheet-like products of photoreaction according to the second embodiment.
Figure 6:
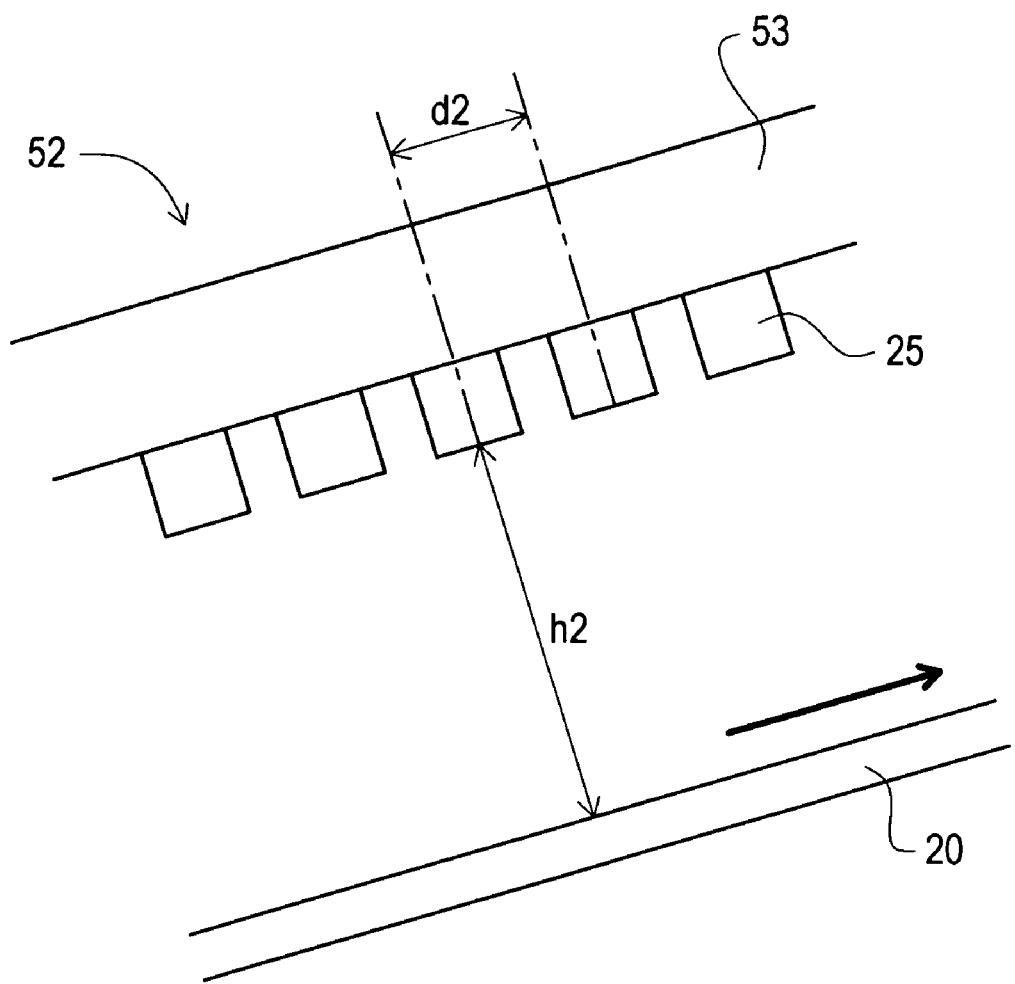
FIG. 6 is a diagram showing a certain enlarged portion of the manufacturing apparatus for sheet-like products of photoreaction according to the second embodiment in the vicinity of ultraviolet ray emitting LEDs.
Figure 7:
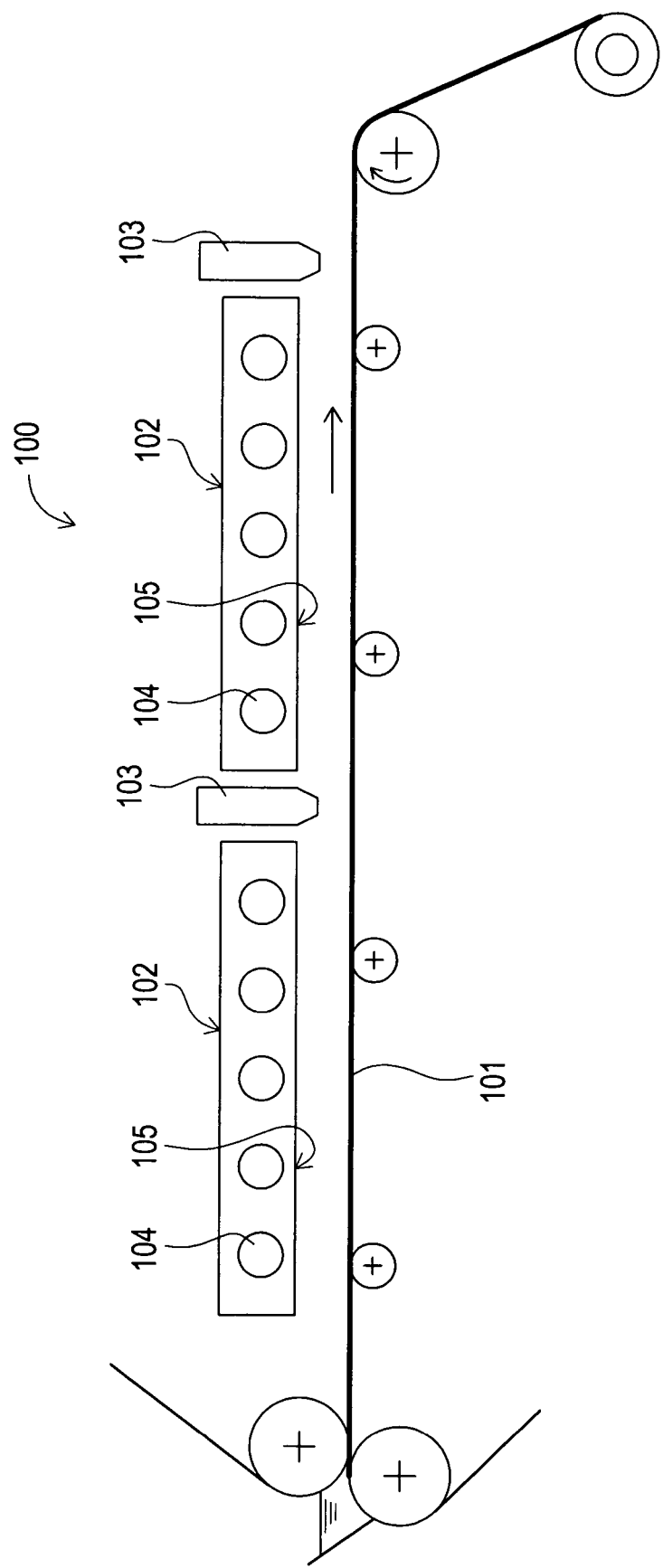
FIG. 7 is a schematic diagram showing a manufacturing apparatus for sheet-like products of photoreaction according to the prior art using a fluorescent light tube type light source.

Next, the schematic structure of the manufacturing apparatus 51 for sheet-like products of photoreaction, which is used to manufacture the sheet-like product of photoreaction according to the second embodiment is described in reference to FIGS. 5 and 6. Here, symbols in the following description which are the same as for the portions in the configuration of the above described manufacturing apparatus 1 for sheet-like products of photoreaction according to the first embodiment shown in FIGS. 1 to 4 indicate the same or corresponding portions in the configuration of the above described manufacturing apparatus 1 for sheet-like products of photoreaction according to the first embodiment.

The schematic configuration of the manufacturing apparatus 51 for sheet-like products of photoreaction according to this second embodiment is approximately the same as the configuration of the manufacturing apparatus 1 for sheet-like products of photoreaction according to the first embodiment.

Here, the manufacturing apparatus 51 for sheet-like products of photoreaction according to the second embodiment is different from the above described manufacturing apparatus 1 for sheet-like products of photoreaction according to the first embodiment in that the multilayer body 20 passes between load applying rolls 61 to 64 placed within the irradiation chamber 10 alternately on the top and the bottom, so that the load applying rolls 61 to 64 make contact with and apply a load to the multilayer body 20 alternately from the top and from the bottom in the vertical direction, while in contrast, the multilayer body 20 is conveyed by the support rolls 21 to 24 in a straight line while the polymerization reaction is induced in the layer of photoreactive product 8 by ultraviolet rays irradiated from the ultraviolet ray emitting LEDs 25 in the irradiation chamber 10 in the manufacturing apparatus 1 for sheet-like products of photoreaction according to the first embodiment.

In the following, the schematic configuration of the manufacturing apparatus 51 for sheet-like products of photoreaction used to manufacture the sheet-like product of photoreaction according to the second embodiment is described in reference to FIG. 5. FIG. 5 is a diagram showing the schematic configuration of the manufacturing apparatus 51 for sheet-like products of photoreaction according to the second embodiment.

As shown in FIG. 5, the irradiation chamber 52 in the manufacturing apparatus 51 for sheet-like products of photoreaction according to the second embodiment is provided with load applying rolls 61 to 67 for supporting the multilayer body 20 which is conveyed through the irradiation chamber 52 and applying a predetermined load to the multilayer body 20 in the direction of the thickness, ultraviolet ray irradiating devices 53 with ultraviolet ray emitting LEDs 25 for radiating ultraviolet rays as the light source, and cooling devices 54 for cooling the multilayer body 20, which becomes of a high temperature state through the polymerization reaction of the layer of photoreactive product 8, by blowing out low temperature air.

In addition, in the layer of photoreactive product 8 in the multilayer body 20 that is conveyed into the irradiation chamber 52, a polymerization reaction is induced by ultraviolet rays irradiated from the above described ultraviolet ray emitting LEDs 25, and a pressure sensitive adhesive layer 31 (see FIG. 4) is formed after the completion of the polymerization reaction.

Here, the load applying rolls 61 to 67 according to the second embodiment are placed in seven locations in total at equal intervals within the irradiation chamber 52 and driven by a separately provided drive motor so as to rotate in such a manner that the speed of conveyance of the multilayer body 20 is in sync with the speed of the surface of the rolls. As a result, the multilayer body 20 can be conveyed into the irradiation chamber 52 without damaging the surface of the sheet-like bases 2 and 3. Here, the load applying rolls 61 to 67 may be rotatably supported, instead of being driven so as to rotate.

In addition, the load applying rolls 61 to 67 support the multilayer body 20 within the irradiation chamber 52, and at the same time, correct the thickness of the multilayer body 20 by applying a predetermined load to the multilayer body 20 on the basis of the holding angle between tension in the multilayer body 20 and the load applying rolls.

In addition, a plurality of ultraviolet ray emitting LEDs 25 are provided above and below the multilayer body 20 which is conveyed through the irradiation chamber 52 at predetermined intervals in the ultraviolet ray irradiating devices 53, which are an irradiating devices for radiating ultraviolet rays toward the upper surface and the lower surface of the multilayer body 20 when light is emitted from the ultraviolet ray emitting LEDs 25. In addition, in the manufacturing apparatus 51 for sheet-like products of photoreaction according to the second embodiment, though the multilayer body is conveyed in such a state as to be inclined in the up-down direction at a predetermined angle between the load applying rolls 61 and 64, each of the ultraviolet ray emitting LEDs 25 is small in size, and it is difficult for the output of radiation of one to be affected by heat from the others, and therefore, it becomes possible to align the ultraviolet ray emitting LEDs 25 along lines inclining at the same angle as the multilayer body. Accordingly, the distance between the multilayer body 20 and the ultraviolet ray emitting LEDs 25 can be kept constant, and thus, it is possible to irradiate ultraviolet rays along a complicated conveyance path for the multilayer body 20. As a result, the intensity of ultraviolet rays with which the multilayer body 20 is irradiated is kept uniform, and thus, more efficient irradiation with light for a longer period of time becomes possible.

Here, FIG. 6 is a diagram showing a certain enlarged portion in the vicinity of ultraviolet ray emitting LEDs 25 in the manufacturing apparatus for sheet-like products of photoreaction according to the second embodiment sown in FIG. 5.

As shown in FIG. 6, ultraviolet ray emitting LEDs 25 arranged so as to incline at a predetermined angle are provided in the ultraviolet ray irradiating devices 53 so that the intervals between adjacent LEDs are d2 and the distance from the multilayer body 20 which is conveyed and inclined at the same angle is always h2. Here, an appropriate value for d2 is 5 mm to 20 mm, in order to uniformly irradiate the entirety of the surface of the multilayer body 20 with a sufficient amount of ultraviolet rays, and 5 mm to 15 mm is preferable. In particular, it becomes possible to gain an optimal sheet-like product of photoreaction 30 by adjusting the value d2 to 10 mm.

Meanwhile, an appropriate distance for h2 is 20 mm to 150 mm, in order to uniformly irradiate the entirety of the surface of the multilayer body 20 with a sufficient amount of ultraviolet rays, and 50 mm to 100 mm is preferable. In particular, it becomes possible to gain an optimal sheet-like product of photoreaction 30 by adjusting the value h2 to 80 mm.

Next, a manufacturing process for manufacturing the sheet-like product of photoreaction 30 using the manufacturing apparatus 51 for sheet-like products of photoreaction having the above described configuration according to the second embodiment is described in the following.

First, sheet-like bases 2 and 3 are fed out in the upper and lower direction, respectively, from the upper surface roll 5A and the lower surface roll 5B. Then, the photoreactive product 4 within the liquid supplying tank 6 is applied between the sheet-like bases 2 and 3 as a layer (having a thickness of 1.0 mm in the second embodiment) when the sheet-like bases 2 and 3 that are fed out pass through the gap 13 created between the upper surface roll 5A and the lower surface roll 5B. As a result, a multilayer body 20 where the layer of photoreactive product 8 is sandwiched in the center as shown in FIG. 2 is formed.

After that, the multilayer body 20 formed in the application portion 5 is conveyed into the irradiation chamber 52 for irradiating ultraviolet rays as energy beams in accordance with the drive for rotation of the conveying roll 11. The multilayer body 20 that is conveyed into the irradiation chamber 52 is irradiated with ultraviolet rays from ultraviolet ray emitting LEDs 25 provided with the ultraviolet ray irradiating devices 53, and as a result, a polymerization reaction is initiated. In addition, low temperature air is blown against the two surfaces of the multilayer body 20 that is conveyed into the cooling device 54, and thus, the layer of photoreactive product 8 that has been heated through the polymerization reaction is cooled. Here, the intensity of ultraviolet rays from the ultraviolet ray emitting LEDs 25 and the speed of conveyance of the multilayer body 20 are set in such a manner that the polymerization reaction in the layer of photoreactive product 8 is almost completed while the multilayer body 20 passes through the irradiation chamber 52. Here, "the polymerization reaction is almost completed" device that the polymerization ratio is no less than 95%.

In addition, in accordance with the manufacturing method for sheet-like products of photoreaction according to the second embodiment, the multilayer body passes between the load applying rolls 61 to 67 arranged within the irradiation chamber 52 before the polymerization reaction is almost completed after the initiation of the polymerization reaction in the layer of photoreactive product 8.

Here, during the polymerization process through irradiation with light, there is inconsistency in the thickness and the waveform changes in the sheet-like product of photoreaction after polymerization, due to the effects of contraction during hardening of the resin, heat emitted in the polymerization of the photoreactive product, and wrinkles from the pull of tension in the film. However, the thickness of the multilayer body can be made uniform and adjusted with high precision by applying a load to the multilayer body in the direction of the thickness using the load applying rolls 61 to 67.

The multilayer body 20 which is conveyed through the irradiation chamber 52 passes through the load applying roll 61 on the upper surface after reaching the load applying roll 61 first, and then passes through the load applying roll 62 on the lower surface of the roll. Furthermore, it passes through the next load applying roll 63 on the upper surface of the roll and passes through the load applying roll 64 on the lower surface of the roll. Then, the multilayer body 20, to which constant tension is applied by the conveying rolls 11, makes contact with the surface of the load applying rolls 61 to 64, when passing between the load applying rolls 61 to 64 alternately on the top and the bottom in such a manner that a load is applied in the vertical direction by the load applying rolls 61 to 64 which make contact with the multilayer body.

Meanwhile, when the multilayer body 20 passes through the load applying rolls 65 to 67 during the latter half of polymerization, the multilayer body passes on the upper surface of the rolls uniformly without a load being applied. This is because at this point in time, polymerization has already progressed to a certain stage where no effects of adjusting the thickness are gained, even when a load is applied. Here, it is, of course, possible for the multilayer body to pass between the load applying rolls 65 to 67 alternately on the top and the bottom.

In addition, it is desirable to apply a load by making the multilayer body pass between the above described load applying rolls 61 to 64 alternately on the top and the bottom when the polymerization ratio in a range from 0% to 70%, in order to prevent the sheet from changing in form and maintain precision in the thickness during the polymerization process. As a result, it becomes possible to manufacture a sheet-like product of photoreaction 30 having a high thickness precision. Meanwhile, even if a load is applied when the polymerization ratio exceeds 70%, fluctuation in the layer of photoreactive product 8 cannot be corrected, and the thickness cannot be sufficiently adjusted.

In addition, it is desirable for the degree of the load applied to the multilayer body 20 through the load applying rolls 61 to 64 to be 0.01 N to 0.25 N when calculated to a load per width unit of 1 cm of the sheet-like bases 2 and 3. As a result, it becomes possible to manufacture a sheet-like product of photoreaction 30 having a high thickness precision. Meanwhile, in the case where the degree of the load is smaller than 0.01 N, the barely any effects of adjusting the thickness can be gained, because the load is too small, while in the case where the degree of the load is greater than 0.25 N, the inconsistency in the thickness becomes greater rather than smaller, because the load is too great.

Then, the sheet-like product of photoreaction 30, of which the thickness has been adjusted by the load applying rolls 61 to 67 and where a pressure sensitive adhesive layer 31 is formed through photopolymerization, is conveyed out from the irradiation chamber 52, passes between the conveying rolls 11 and is rolled up by the winding portion 12. In addition, the rolled up sheet-like product of photoreaction 30 is cut into pieces of a predetermined size, and thus, a target adhesive tape can be gained.

As described above in detail, in the manufacturing apparatus 51 and the manufacturing method for sheet-like products of photoreaction according to the second embodiment, while a polymerization reaction is induced in the layer of photoreactive product 8 by ultraviolet rays irradiated from the ultraviolet ray emitting LEDs 25 in the irradiation chamber 52, the multilayer body 20 that is formed through application of a layer between sheet-like bases 2 and 3 in the application portion 5 passes between the load applying rolls 61 to 64 arranged within the irradiation chamber 52 alternately on the top and the bottom in such a manner that a load is applied to the multilayer body 20 in the vertical direction by the load applying rolls 61 and 64 that make contact with the multilayer body, and therefore, it becomes possible to correct the form of the multilayer body 20 that has been changed in the polymerization reaction requiring expensive, high-precision equipment. Accordingly, it becomes possible to manufacture a sheet-like product of photoreaction 30 having a high thickness precision, where there is no risk of defects being caused in terms of quality. In addition, each of the ultraviolet ray emitting LEDs 25, which are the light source, is small in size, and therefore, the ultraviolet ray irradiating devices, where ultraviolet ray emitting LEDs 25 are provided, can be designed so as to be aligned along a complicated conveyance line for the multilayer body 20 which inclines alternately up and down. As a result, the intensity of ultraviolet rays with which the multilayer body 20 is illuminated can be made uniform, and more efficient irradiation with light for a longer period of time becomes possible.

In addition, the sheet-like product of photoreaction 30 manufactured in accordance with the manufacturing apparatus 51 and the manufacturing method for sheet-like products of photoreaction according to the second embodiment is a sheet having a high thickness precision as a result of the correction of the form of the multilayer body that is changed through polymerization through irradiation with light, and it is possible to use this as an adhesive tape or adhesive sheet having high quality.

Here, the present invention is not limited to the above described embodiments, and various improvements and modifications are, of course, possible, as long as the gist of the present invention is not deviated from.

For example, though an application liquid of a liquid supplying tank 6 is supplied between sheet-like bases 2 and 3 which are, respectively, fed out from an upper surface roll 5A and a lower surface roll 5B, as a device for applying the application liquid to the sheet-like bases 2 and 3 according to the first and second embodiments, it is possible to apply an application liquid directly to the sheet-like bases 2 and 3 using a die coater, a roll coater, a roll knife coater or a knife coater before polymerization and hardening.

INDUSTRIAL APPLICABILITY

The present invention can provide a manufacturing method and an apparatus for sheet-like products of photoreaction where photopolymerization reaction is induced in a photoreactive product using ultraviolet rays emitted from LEDs when a sheet-like product of photoreaction is manufactured through photopolymerization of a photoreactive product.

The invention claimed is:

1. A manufacturing method for sheet-like products of photoreaction comprising:
   conveying a multilayer body, made of a photoreactive product and sheet-like members in layers that sandwich the photoreactive product, in a predetermined direction; and
   inducing a polymerization reaction in the photoreactive product by irradiating one side or two sides of the conveyed multilayer body in the conveying with ultraviolet rays emitted from plural LEDs,
   wherein the multilayer body conveyed in the predetermined direction is cooled by cooling devices, each of the cooling devices being placed adjacent to a series of the plural LEDs successively arranged along the predetermined direction in which the multilayer body is conveyed, such that a combination is formed that comprises a series of the successively arranged plural LEDs in an area and a cooling device following the area, and the combination is repeated plural times along the predetermined direction in which the multilayer body is conveyed,
   wherein the cooling devices are placed as a pair with one of the paired cooling devices being placed over the conveyed multilayer body and another of the paired cooling devices being placed under the conveyed multilayer body, and
   wherein the cooling devices cool the conveyed multilayer body by blowing air against the two sides of the conveyed multilayer body.

2. The manufacturing method for sheet-like products of photoreaction according to claim 1, wherein the sheet-like product of photoreaction manufactured by the manufacturing method for sheet-like products of photoreaction is a pressure sensitive adhesive sheet.

* * * * *

UNITED STATES PATENT AND TRADEMARK OFFICE
CERTIFICATE OF CORRECTION

PATENT NO. : 8,093,310 B2  
APPLICATION NO. : 11/922318  
DATED : January 10, 2012  
INVENTOR(S) : Isao Hirose Page 1 of 1

It is certified that error appears in the above-identified patent and that said Letters Patent is hereby corrected as shown below:

Title Page item 73
Please change Assignee city "ibaraki (JP)" to "Ibaraki (JP)"

Signed and Sealed this
Twenty-eighth Day of February, 2012

David J. Kappos
*Director of the United States Patent and Trademark Office*